(12) United States Patent
Adachi et al.

(10) Patent No.: US 10,995,823 B2
(45) Date of Patent: May 4, 2021

(54) POWER UNIT FOR SADDLED VEHICLE

(71) Applicant: HONDA MOTOR CO., LTD., Tokyo (JP)

(72) Inventors: Jun Adachi, Wako (JP); Yoshihisa Kanno, Wako (JP); Yoshitaka Nukada, Wako (JP); Yoshiaki Tsukada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 16/368,184

(22) Filed: Mar. 28, 2019

(65) Prior Publication Data
US 2019/0301569 A1    Oct. 3, 2019

(30) Foreign Application Priority Data
Mar. 30, 2018    (JP) .............................. JP2018-068937

(51) Int. Cl.
| | | |
|---|---|---|
| *F16H 3/00* | (2006.01) | |
| *B62M 11/06* | (2006.01) | |
| *F16H 57/021* | (2012.01) | |
| *F16H 3/091* | (2006.01) | |
| *F16H 63/18* | (2006.01) | |
| *F16H 57/12* | (2006.01) | |
| *F16H 55/18* | (2006.01) | |
| *B62K 11/04* | (2006.01) | |
| *F16H 57/02* | (2012.01) | |

(52) U.S. Cl.
CPC .............. *F16H 3/006* (2013.01); *B62M 11/06* (2013.01); *F16H 3/091* (2013.01); *F16H 57/021* (2013.01); *F16H 57/12* (2013.01); *F16H 63/18* (2013.01); *B62K 11/04* (2013.01); *F16H 55/18* (2013.01); *F16H 2057/02065* (2013.01)

(58) Field of Classification Search
CPC .......... F16H 3/006; F16H 63/18; F16H 3/091; F16H 57/12; B62M 11/06
See application file for complete search history.

(56) References Cited

U.S. PATENT DOCUMENTS

| | | | | |
|---|---|---|---|---|
| 2011/0100144 | A1* | 5/2011 | Neelakantan | ......... F16H 61/688 |
| | | | | 74/473.36 |
| 2017/0023134 | A1* | 1/2017 | Sugano | ................... F16H 63/18 |
| 2017/0227125 | A1* | 8/2017 | Fujimoto | ................ F16H 63/18 |

(Continued)

FOREIGN PATENT DOCUMENTS

| | | |
|---|---|---|
| JP | 61-274150 A | 12/1986 |
| JP | S61-274150 A | 12/1986 |

(Continued)

*Primary Examiner* — Terence Boes
(74) *Attorney, Agent, or Firm* — Carrier Blackman and Associates, P.C.; Joseph P. Carrier; William D. Blackman

(57) ABSTRACT

As viewed from a side, an output shaft is disposed rearward of a crankshaft, and an odd-numbered stage shaft and an even-numbered stage shaft are disposed rearward of the crankshaft. Moreover, the odd-numbered stage shaft is provided on a side opposite to the even-numbered stage shaft relative to a line connecting the crankshaft and the output shaft, and a shift drum is disposed on a side opposite to the output shaft relative to a line connecting the odd-numbered stage shaft and the even-numbered stage shaft. This structure reduces dimensions of the power unit for the saddled vehicle.

16 Claims, 11 Drawing Sheets

(56) References Cited

U.S. PATENT DOCUMENTS

| | | | | |
|---|---|---|---|---|
| 2018/0244349 A1* | 8/2018 | Sugano | .................. | B62M 11/06 |
| 2019/0301540 A1* | 10/2019 | Adachi | .................. | F16D 23/08 |
| 2019/0309828 A1* | 10/2019 | Kittaka | .................. | F16H 63/32 |
| 2020/0102883 A1* | 4/2020 | Nukada | .................... | B62J 41/00 |
| 2020/0200254 A1* | 6/2020 | Ishii | .................... | F16H 57/0006 |
| 2021/0010592 A1* | 1/2021 | Kittaka | .................. | B62M 11/06 |

FOREIGN PATENT DOCUMENTS

| | | |
|---|---|---|
| JP | H01-169659 U | 11/1989 |
| JP | 2012-210855 A | 11/2012 |
| JP | 2013-177958 A | 9/2013 |
| JP | 2014-163469 A | 9/2014 |
| JP | 2016-200176 A | 12/2016 |

* cited by examiner

POWER UNIT FOR SADDLED VEHICLE

BACKGROUND

1. Technical Field

The present invention relates to a power unit for a saddled vehicle, having a transmission with a twin clutch.

2. Description of the Background

A transmission may include an odd-numbered stage shaft and an even-numbered stage shaft that are arranged in parallel and may include a twin clutch unit that has two clutches of which operations of connection and disconnection are performed independently of each other. The twin clutch unit selectively transmits a driving force from a crankshaft to either one of the odd-numbered stage shaft and the even-numbered stage shaft. The odd-numbered stage shaft and the even-numbered stage shaft respectively have driving gears for changing speed stages. The driving gear of the odd-numbered stage shaft and the driving gear of the even-numbered stage shaft share a driven gear of an output shaft. Such an existing technique is disclosed in Patent Literature 1.

The transmission having such a structure may be employed in a power unit for a saddled vehicle, having an internal-combustion engine and a transmission. In this case, a shift drum should be disposed in the power unit in addition to the transmission. Under these conditions, it is necessary to reduce overall dimensions of the power unit.

CITATION LIST

Patent Literature

Patent Literature 1: Japanese Unexamined Patent Application Laid-Open No. 61-274150.

BRIEF SUMMARY

An object of the present invention is to provide a technique for reducing overall dimensions of a power unit for a saddled vehicle. The power unit has a transmission and an internal-combustion engine that are combined together. The transmission includes a twin clutch and includes an odd-numbered stage shaft and an even-numbered stage shaft that respectively have driving gears for changing speed stages. The driving gear that is provided to the odd-numbered stage shaft and the driving gear that is provided to the even-numbered stage shaft share a driven gear of an output shaft.

The present invention solves the above-described problem and provides a power unit for a saddled vehicle. The power unit includes an internal-combustion engine, an odd-numbered stage shaft and an even-numbered stage shaft that receive power from a crankshaft, and a twin clutch unit contained in a unit case. The clutch unit includes a first clutch and a second clutch to transmit the power in accordance with selective connection of the first clutch and the second clutch. The first clutch transmits and shuts off the power between the crankshaft and the odd-numbered stage shaft. The second clutch transmits and shuts off the power between the crankshaft and the even-numbered stage shaft. The power unit also includes an output shaft that receives the power from a selected one of the odd-numbered stage shaft and the odd-numbered stage shaft, multiple odd-numbered stage driving gears provided to the even-numbered stage shaft, multiple even-numbered stage driving gears provided to the even-numbered stage shaft, and multiple driven gears provided to the output shaft. The driven gears respectively mesh with the odd-numbered stage driving gears and also respectively mesh with the even-numbered stage driving gears. The power unit also includes gear switching mechanisms, a shift fork that moves the gear switching mechanism in an axial direction, and a shift drum that drives the shift fork. One of the gear switching mechanisms is provided to the even-numbered stage shaft and moves in the axial direction to transmit and shut off a driving force from the odd-numbered stage shaft, to and from the odd-numbered stage driving gear. The other gear switching mechanism is provided to the even-numbered stage shaft and moves in the axial direction to transmit and shut off a driving force from the even-numbered stage shaft, to and from the even-numbered stage driving gear. The odd-numbered stage shaft, the even-numbered stage shaft, the output shaft, and the shift drum are arranged in parallel.

As viewed from a side of the saddled vehicle, the output shaft is disposed rearward of the crankshaft.

The odd-numbered stage shaft and the even-numbered stage shaft are disposed rearward of the crankshaft.

The odd-numbered stage shaft is provided on a side opposite to the even-numbered stage shaft relative to a line connecting the crankshaft and the output shaft.

The shift drum is disposed on a side opposite to the output shaft relative to a line connecting the odd-numbered stage shaft and the even-numbered stage shaft.

The power unit having this structure may be used as a power unit for a saddled vehicle, having an internal-combustion engine and a transmission that are combined together. In this case, the transmission includes a driving shaft that is separated into an odd-numbered stage shaft and an even-numbered stage shaft, whereby the power unit is reduced in dimension in a width direction. The transmission has shafts and a shift drum that are disposed close to each other, thereby being reduced in dimension as viewed from the side of the vehicle. Thus, overall dimensions of the power unit is reduced.

In this structure, at least one of the odd-numbered stage shaft and the even-numbered stage shaft may be disposed between the crankshaft and the output shaft in a front-rear direction of the vehicle.

This structure enables disposing the shafts and the shift drum of the transmission close to a center of the power unit, thereby reducing dimensions of the power unit.

In the above-described structure, each of the driven gears on the output shaft may constantly mesh with either one of the odd-numbered stage driving gears and may also constantly mesh with the even-numbered stage driving gear that is paired with the either one of the odd-numbered stage driving gears, thereby being shared.

This structure enables decreasing the number of the gears on the output shaft, thereby reducing the dimension in the axial direction of the power unit.

In the above-described structure, the first clutch and the second clutch may be disposed to either one of the odd-numbered stage shaft and the even-numbered stage shaft. The one shaft may relatively rotatably support a transmitting gear that receives the power from the crankshaft via the second clutch. The output shaft may relatively rotatably support an idle gear that constantly meshes with the transmitting gear. The other shaft of the odd-numbered stage shaft and the even-numbered stage shaft may include a transmitted gear in a relatively unrotatable manner, which constantly meshes with the idle gear. The idle gear may be made to have a diameter that is greater than a diameter of the transmitting gear and a diameter of the transmitted gear.

In this structure, the idle gear with a large diameter meshes with both of the transmitting gear and the transmitted gear, and thus, the transmitting gear and the transmitted gear are reduced in diameter. This enables reducing the dimension of the power unit as viewed from the side.

In the above-described structure, a center distance between the odd-numbered stage shaft and the output shaft may be made longer than a center distance between the even-numbered stage shaft and the output shaft.

In general, a gear with a small diameter has a small number of teeth, and therefore, a ratio is greatly changed by changing the number of teeth only by one and is difficult to adjust. However, a target ratio is easily achieved by the following manner. That is, the speed is greatly increased at the transmitted gear from the transmitting gear via the idle gear, and the resultant ratio is finely adjusted so that the speed is decreased by the gear on the transmission shaft, which has a diameter greater than that of each of the transmitting gear and the transmitted gear.

In the above-described structure, the idle gear may include a scissors gear at each surface. The scissors gears may be urged in directions opposite to each other, and one of the scissors gears may mesh with the transmitting gear, whereas the other may mesh with the transmitted gear.

This structure enables decreasing a backlash between the idle gear and the transmitting gear and a backlash between the idle gear and the transmitted gear, thereby reducing rattle noise that is generated between the gears.

In the above-described structure, as viewed from the side of the vehicle, an engine hanger for supporting the power unit for the saddled vehicle may be disposed under the even-numbered stage shaft.

This structure enables using a body frame for supporting a power unit that has one shaft for supporting driving gears without greatly changing the structure although the two shafts, the odd-numbered stage shaft and the even-numbered stage shaft, are used for supporting the driving gears. This is because the transmitted gear of the even-numbered stage shaft is made to have a small diameter, and the engine hanger for supporting the power unit for the saddled vehicle is disposed under the even-numbered stage shaft.

In the above-described structure, all of the odd-numbered stage driving gears may be relatively rotatably supported by the odd-numbered stage shaft.

The odd-numbered stage shaft may have an end that is rotatably supported by the unit case via a bearing.

The bearing and the odd-numbered stage driving gear may have a washer that is provided therebetween and that rotates integrally with the odd-numbered stage shaft.

The washer may have a circumferential edge that is formed with projecting teeth.

Projections and recessions that are formed by the projecting teeth may be sensed by a rotation sensor to measure a number of rotation of the odd-numbered stage shaft.

In this structure, a number of rotation of the odd-numbered stage shaft, which rotatably supports all of the odd-numbered stage driving gears, is measured by using the projecting teeth that are provided to the washer used in the structure. This enables measuring the number of rotation of the odd-numbered stage shaft without having to separately provide a dedicated component.

The power unit for the saddled vehicle according to the present invention may be used as a power unit for a saddled vehicle, having an internal-combustion engine and a transmission that are combined together. In this case, the transmission includes a driving shaft that is separated into an odd-numbered stage shaft and an even-numbered stage shaft, whereby the power unit is reduced in dimension in a width direction. The transmission has shafts and a shift drum that are disposed close to each other, thereby being reduced in dimension as viewed from a side of the vehicle. Thus, overall dimensions of the power unit is reduced.

DETAILED DESCRIPTION

A transmission T of a power unit P according to an embodiment of the present invention will be described with reference to the attached drawings.

In descriptions in this specification and in claims, a front-rear direction, a left-right direction, and an up-down direction represent directions relative to a vehicle in a condition in which a power unit according to the present invention is mounted on a vehicle, in particular, a motorcycle. The drawings show arrows FR, RE, RH, LH, UP, and DW, which represent a front direction, a rear direction, a right-hand direction, a left-hand direction, an upward direction, and a downward direction, respectively.

Figure 1:
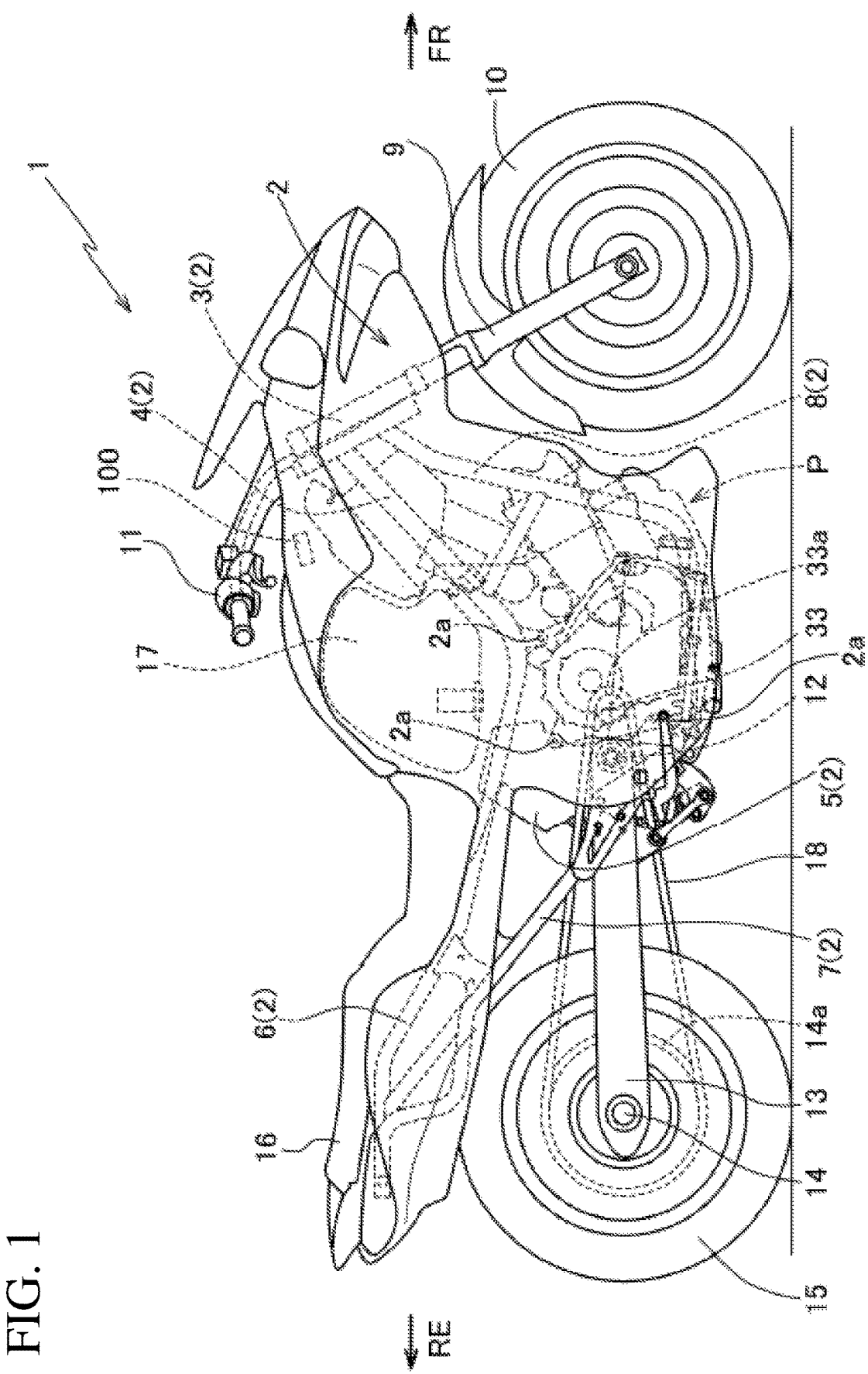
FIG. 1 is a right side view of a motorcycle mounted with a power unit of an embodiment of the present invention.

FIG. 1 shows a motorcycle 1 having a body frame 2. The body frame 2 includes a head tube 3, a main frame member 4, a center frame member 5, a seat stay 6, a middle stay 7, and a down frame 8. The head tube 3 is disposed on a front part of the body frame 2. The main frame member 4 obliquely extends downward rearward from the head tube 3, bends at a midway part, and further extends rearward. The center frame member 5 extends downward from a rear end of the main frame member 4. The seat stay 6 extends from an upper part of the center frame member 5 in the rear direction. The middle stay 7 is disposed between a rear part of the center frame member 5 and a rear part of the seat stay 6. The down frame 8 extends downward from the head tube 3.

The head tube 3 steerably supports a front fork 9 that rotatably supports a front wheel 10 at a lower end part. The front fork 9 is connected to a steering handlebar 11 at an upper end part. The center frame member 5 swingably supports a swing arm 13 via a pivot shaft 12. The swing arm 13 rotatably supports a rear wheel 15 at a rear end via a rear wheel shaft 14.

The seat stay 6 has a passenger seat 16 that is mounted thereover. The passenger seat 16 has a fuel tank 17 in front thereof, and the fuel tank 17 is mounted over the main frame member 4.

The motorcycle 1 is mounted with the power unit P in which a rotation axis of a crankshaft 23 is directed in a left-right direction. The power unit P operates for driving the rear wheel 15. The power unit P has an output shaft 33 to which a driving sprocket 33a is fitted. The rear wheel shaft 14 has a driven sprocket 14a that is fitted thereto. The driving sprocket 33a and the driven sprocket 14a have an endless chain 18 that is stretched therebetween.

The power unit P is supported at a front part, a center upper part, a rear upper part, and a rear lower part by multiple engine hangers 2a that are provided to the body frame 2. The engine hanger 2a that supports the rear lower part of the power unit P is positioned under an even-numbered stage shaft 32, which is described later.

Figure 2:
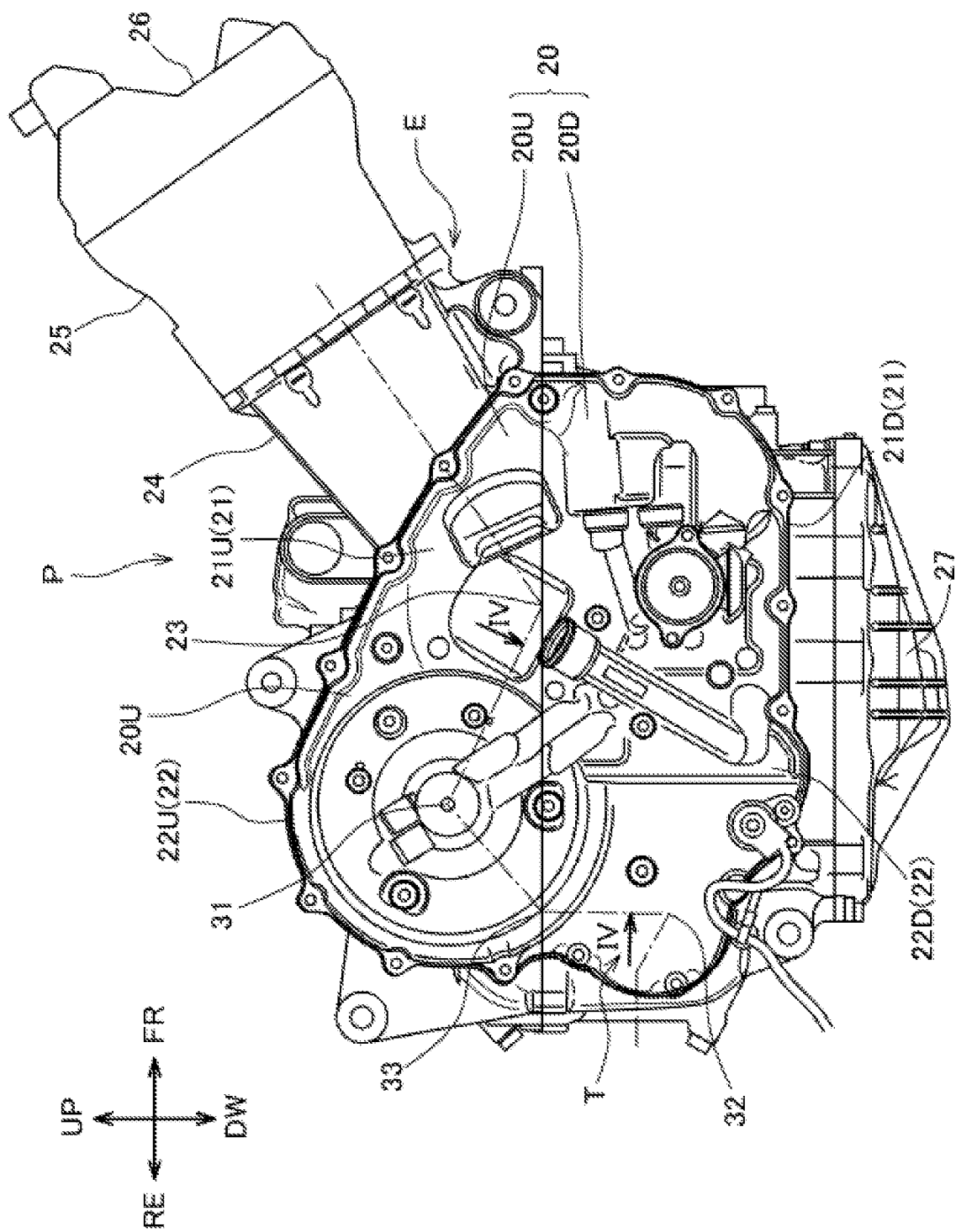
FIG. 2 is a right side view of the power unit.

As shown in FIG. 2, the power unit P includes a water-cooled, 2-cylinder, 4-stroke cycle internal-combustion engine (hereinafter called "internal-combustion engine") E and a transmission T that are combined together. The transmission T is connected to the rear of the internal-combustion engine E. The transmission T performs a gear shift operation under control of a gear shift control system 100 that is mounted on the motorcycle 1. The internal-combustion engine E is provided with an engine speed measuring unit 101 that measures a number Ne of rotation of the engine. The measured number Ne of rotation of the engine is sent to the gear shift control system 100.

The power unit P includes a unit case 20 that has a crankcase 21 as a front half part and a transmission case 22 as a rear half part, which are integrally formed in the front-rear direction. The crankcase 21 rotatably supports the crankshaft 23. The transmission case 22 houses a transmission mechanism 30 of the transmission T. The unit case 20 is constituted of upper and lower divided parts: an upper unit-case half part 20U and a lower unit-case half part 20D. The upper unit-case half part 20U includes an upper crankcase half part 21U and an upper transmission-case half part 22U, which are integrally formed. The lower unit-case half part 20D includes a lower crankcase half part 21D and a lower transmission-case half part 22D, which are integrally formed.

The upper crankcase half part 21U has an upper part on which a cylinder block 24, a cylinder head 25, and a head cover 26 are sequentially stacked in an oblique upward direction toward the front direction so as to protrude in a forward tilting manner.

The lower unit-case half part 20D has a lower side that is closed with an oil pan 27.

Figure 6:
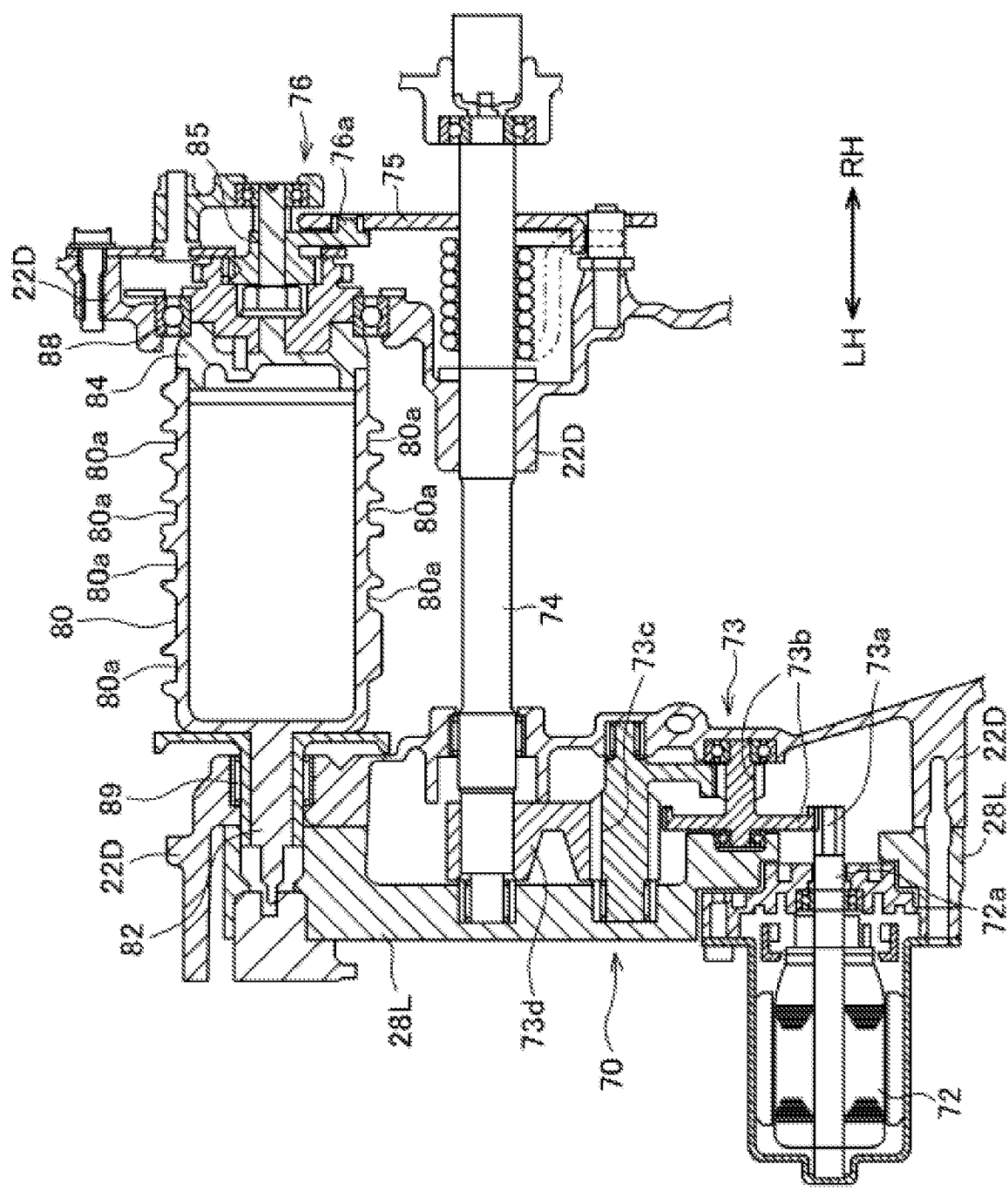
FIG. 6 is a sectional view of the periphery of a transmission.

The unit case 20 has a right side that is covered with a right unit-case cover 28R and has a left side that is covered with a left unit-case cover 28L (refer to FIG. 6).

The crankshaft 23 is held by the upper crankcase half part 21U and the lower crankcase half part 21D via bearings, which are not shown, thereby being rotatably supported by the crankcase 21.

Figure 4:
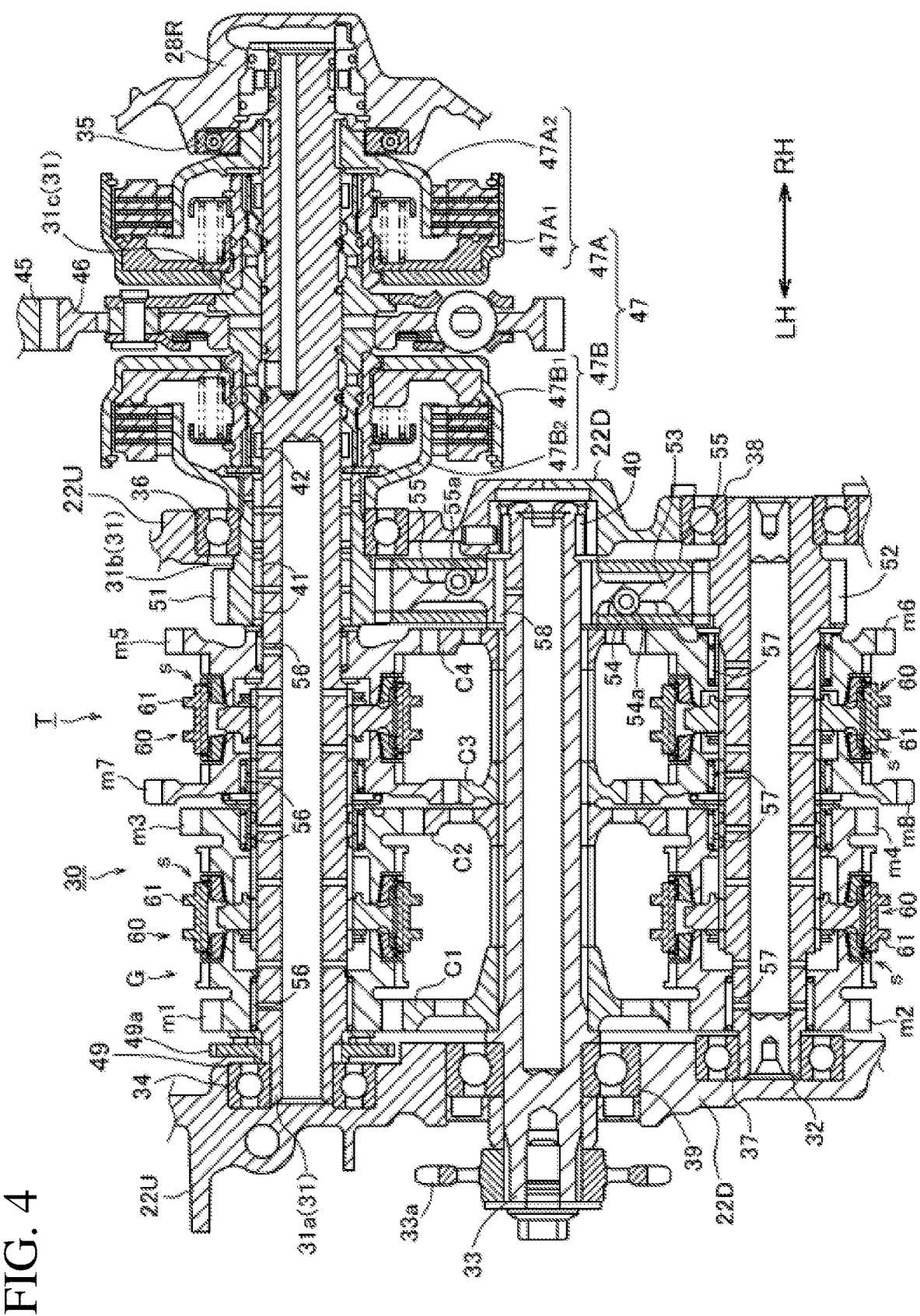
FIG. 4 is a sectional view taken along a line IV-IV in FIG. 2.
Figure 5:
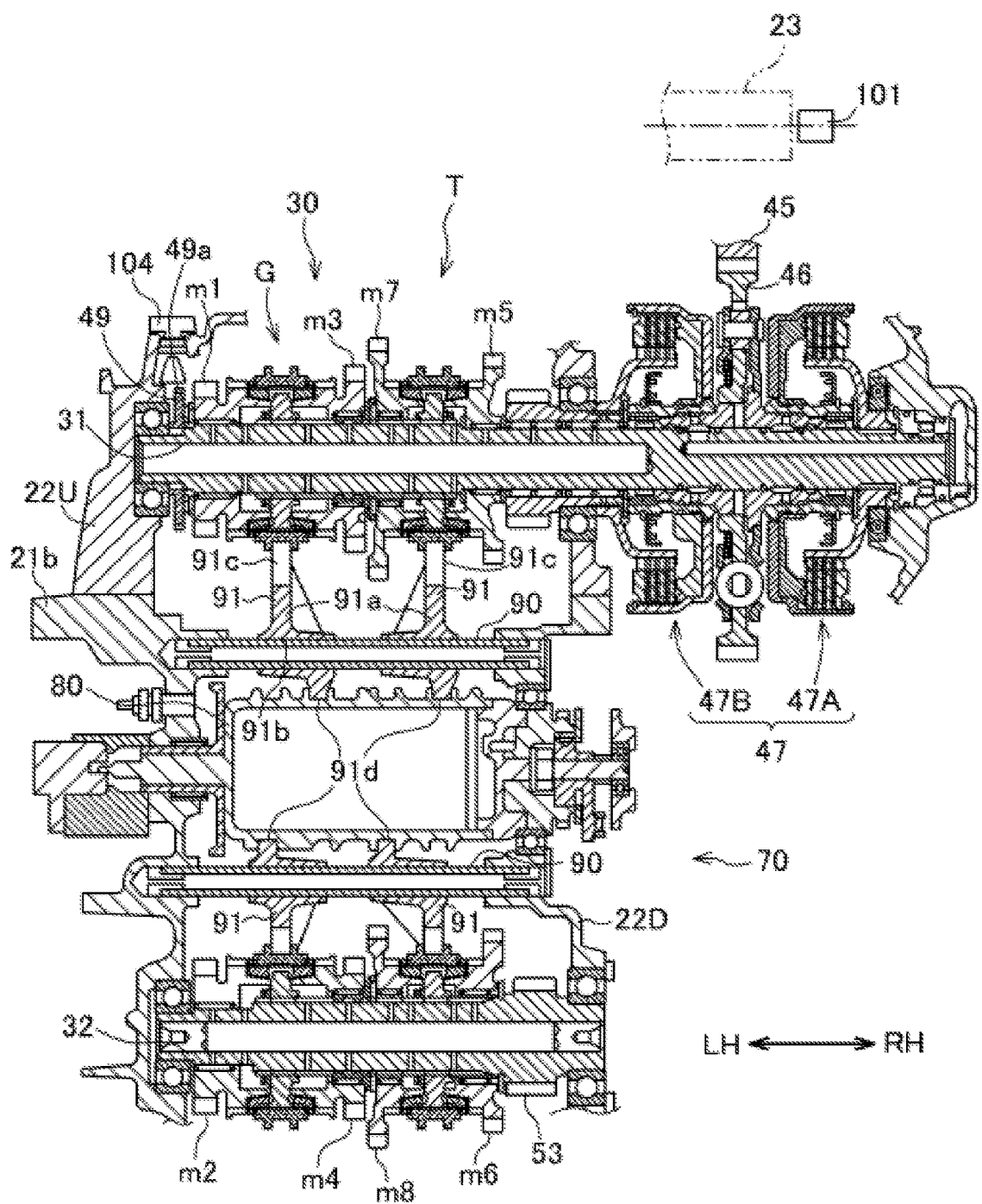
FIG. 5 is a sectional view taken along a line V-V in FIG. 3.

As shown in FIGS. 4 to 6, the transmission T that transmits a driving force of the internal-combustion engine E to a shifted gear of a predetermined speed stage includes a constant-mesh transmission mechanism 30, a gear shift operation mechanism 70, and a clutch unit 47. The gear shift operation mechanism 70 controls speed stages of the transmission mechanism 30. The clutch unit 47 has a first clutch 47A and a second clutch 47B, which is generally called a twin clutch. The transmission T is configured to have 8 forward speed stages.

As shown in FIGS. 4 and 5, the transmission mechanism 30 of the transmission T includes an odd-numbered stage shaft 31, an even-numbered stage shaft 32, the output shaft 33, and a gear group G. The odd-numbered stage shaft 31 is an input shaft and is disposed with driving gears m1, m3, m5, and m7 of odd-numbered stages. The even-numbered stage shaft 32 receives a rotational driving force from the odd-numbered stage shaft 31 and is disposed with driving gears m2, m4, m6, and m8 of even-numbered stages. The output shaft 33 has driven gears c1 to c4 with which the driving gears m1 to m8 of the odd-numbered stages and the even-numbered stages respectively mesh. The gear group G has the driving gears m1 to m8 of the odd-numbered stages and the even-numbered stages and the driven gears c1 to c4. The odd-numbered stage shaft 31, the even-numbered stage shaft 32, the output shaft 33, a shift drum 80, and a shift fork shaft 90 are disposed in parallel to the crankshaft 23 and are directed in the left-right direction. The shift drum 80 and the shift fork shaft 90 are described later.

Figure 3:
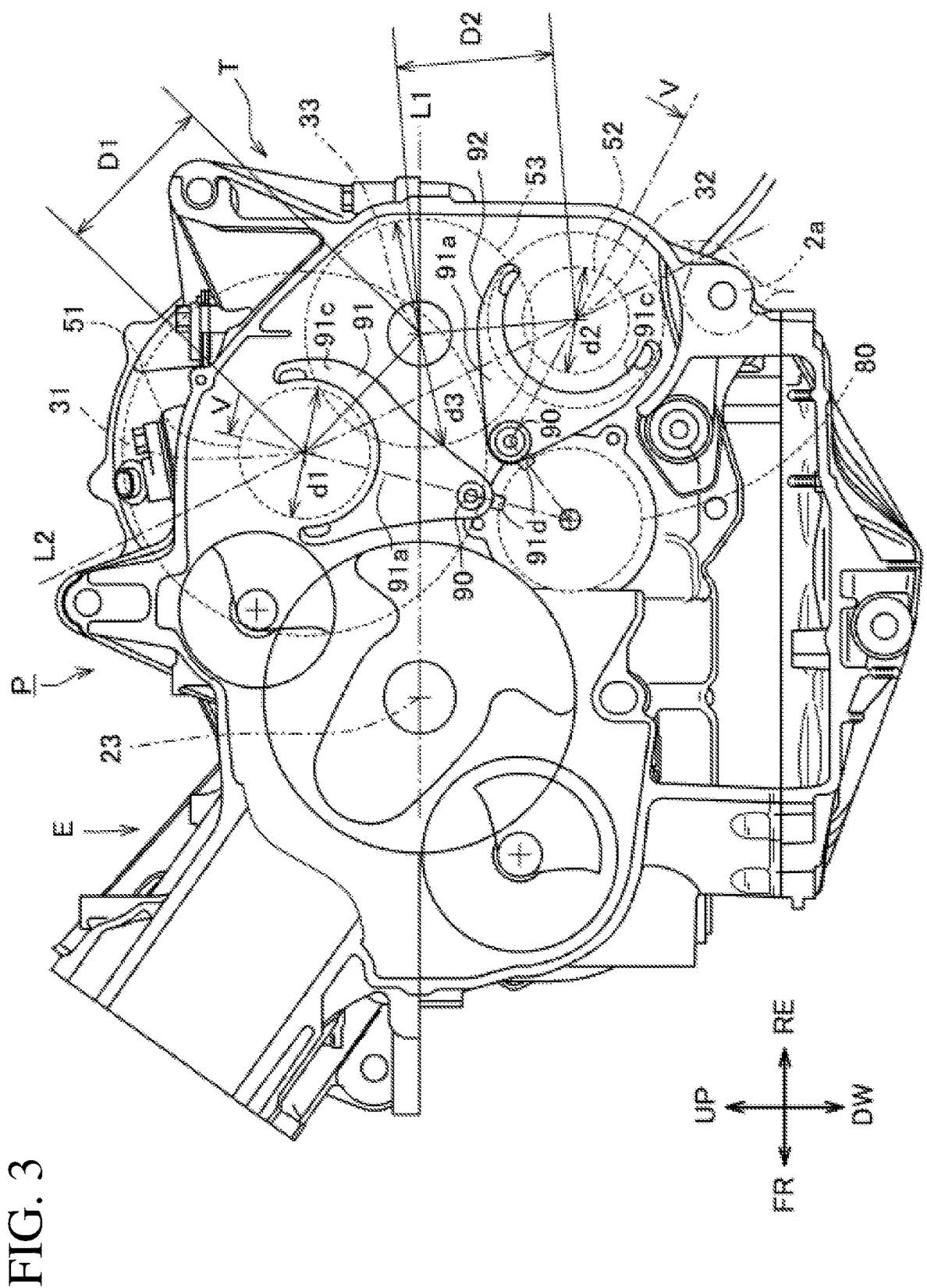
FIG. 3 is a left side view of the power unit of which a unit case cover is removed.

FIG. 3 shows the crankshaft 23, the odd-numbered stage shaft 31, the even-numbered stage shaft 32, and the shift drum 80 as viewed from a side of the vehicle. The output shaft 33 is disposed rearward of the crankshaft 23. The odd-numbered stage shaft 31 and the even-numbered stage shaft 32 are disposed rearward of the crankshaft 23. In addition, the odd-numbered stage shaft 31 is provided on a side opposite to the even-numbered stage shaft 32 relative to a line L1 connecting the crankshaft 23 and the output shaft 33. The shift drum 80 is disposed on a side opposite to the output shaft 33 relative to a line L2 connecting the odd-numbered stage shaft 31 and the even-numbered stage shaft 32. At least one of the odd-numbered stage shaft 31 and the even-numbered stage shaft 32 are disposed between the crankshaft 23 and the output shaft 33 in the front-rear direction of the vehicle. In this embodiment, the odd-numbered stage shaft 31 is disposed between the crankshaft 23 and the output shaft 33. The odd-numbered stage shaft 31, the even-numbered stage shaft 32, and the output shaft 33 are arranged so that a center distance D1 between the odd-numbered stage shaft 31 and the output shaft 33 will be longer than a center distance D2 between the even-numbered stage shaft 32 and the output shaft 33.

As shown in FIG. 3, the odd-numbered stage shaft 31 is disposed rearward of the crankshaft 23 in an oblique upward direction, to the upper transmission-case half part 22U. As shown in FIG. 4, the odd-numbered stage shaft 31 includes an odd-numbered stage main shaft 31a, a power-transmission outer shaft 31b, and a clutch outer shaft 31c. The odd-numbered stage main shaft 31a receives a rotational driving force from the crankshaft 23 via the first clutch 47A. The power-transmission outer shaft 31b is relatively rotatably disposed to cover an approximately center of the odd-numbered stage main shaft 31a and transmits a rotational driving force to the even-numbered stage via the second clutch 47B. The clutch outer shaft 31c is relatively rotatably supported on a right end side of the odd-numbered stage main shaft 31a, in adjacent to the power-transmission outer shaft 31b. The odd-numbered stage shaft 31 is provided with an odd-numbered stage shaft rotation sensor 104 that measures a number of rotation of the odd-numbered stage shaft 31.

The odd-numbered stage main shaft 31a has a left end that is rotatably supported by the upper transmission-case half part 22U via a ball bearing 34 and has a right end that is rotatably supported by the right unit-case cover 28R via a ball bearing 35. The odd-numbered stage main shaft 31a has the driving gears m1, m3, m7, and m5 of the odd-numbered stages, in this order from the left side, which are relatively rotatably mounted via respective needle bearings 56.

The bearing 34 and the odd-numbered stage driving gear m1 have a washer 49 that is provided therebetween. The washer 49 is spline-fitted to the odd-numbered stage shaft 31 to integrally rotate therewith. The washer 49 has a circumferential edge that is formed with projecting teeth 49a. The odd-numbered stage shaft rotation sensor 104 senses projections and recessions formed by the projecting teeth 49a of the washer 49, to measure the number of rotation of the odd-numbered stage shaft 31.

The power-transmission outer shaft 31b is relatively rotatably supported at a part from the center toward the right end side of the odd-numbered stage main shaft 31a via a needle bearing 41. The power-transmission outer shaft 31b has a right end, to which an inner clutch 47B$_2$ of the second clutch 47B is relatively unrotatably fitted, and has a left end, to which a transmitting gear 51 is integrally formed to transmit power to the even-numbered stage shaft 32.

The clutch outer shaft 31c is rotatably supported at a part from the power-transmission outer shaft 31b toward the outside in the right direction of the odd-numbered stage main shaft 31a via a needle bearing 42. The clutch outer shaft 31c has a center to which a primary driven gear 46 is relatively unrotatably fitted. The primary driven gear 46 meshes with a primary driving gear 45 that is fitted to the crankshaft 23. The primary driven gear 46 is disposed between the first clutch 47A, which is arranged on a right side, and the second clutch 47B, which is arranged on a left side.

The first clutch 47A has an outer clutch 47A$_1$. The second clutch 47B has an outer clutch 47B$_1$. These outer clutches 47A$_1$ and 47B$_1$ are respectively fitted to the clutch outer shaft 31c in an integrally rotatable manner. The first clutch 47A has an inner clutch 47A$_2$ that is spline-fitted to the odd-numbered stage main shaft 31a. The second clutch 47B has the inner clutch 47B$_2$ that is spline-fitted to the power-transmission outer shaft 31b.

The crankshaft 23 supplies a rotational driving force, which is reduced at a predetermined reduction ratio by the primary driving gear 45 and the primary driven gear 46 and is transmitted to the clutch outer shaft 31c. The rotational driving force that is transmitted to the clutch outer shaft 31c is transmitted to the odd-numbered stage main shaft 31a or the power-transmission outer shaft 31b, in response to selective connection of the first clutch 47A and the second clutch 47B, which is performed by an oil-hydraulic circuit (not shown).

The output shaft 33 receives power from the transmission T. The output shaft 33 is disposed rearward of the crankshaft 23 while being held between the upper transmission-case half part 22U and the lower transmission-case half part 22D. The output shaft 33 is rotatably supported by the transmission case 22 in the condition in which a left end passes through a ball bearing 39, and a part on the left end side and a right end are held between the upper transmission-case half part 22U and the lower transmission-case half part 22D, respectively via a ball bearing 39 and a needle bearing 40. The left end of the output shaft 33 is inserted into a driving sprocket 33a.

The power-transmission outer shaft 31b of the odd-numbered stage shaft 31 is relatively rotatably supported by the odd-numbered stage main shaft 31a via the needle bearing 41. The power-transmission outer shaft 31b is integrally formed with the transmitting gear 51 that is adjacently disposed on a left side of a ball bearing 36. The transmitting gear 51 transmits power from the odd-numbered stage shaft 31 to the even-numbered stage shaft 32. The power-transmission outer shaft 31b has a right end that is spline-fitted to the inner clutch 47B$_2$ of the second clutch 47B, whereby power from the crankshaft 23 is transmitted and is shut off by the second clutch 47B.

The even-numbered stage shaft 32 has a transmitted gear 52 that is provided on a right end side. The transmitted gear 52 integrally rotates with the even-numbered stage shaft 32. The right end of the output shaft 33 relatively rotatably supports an idle gear 53 via a needle bearing 58. The idle gear 53 meshes with each of the transmitting gear 51 and the transmitted gear 52.

As shown in FIG. 4, the idle gear 53 has a left side to which a first scissors gear 54 is relatively rotatably fitted. The first scissors gear 54 has a diameter approximately the same as an outer diameter of the idle gear 53. The first scissors gear 54 meshes with the transmitting gear 51 and is urged by a spring 54a in a direction opposite to a rotation direction of the transmitting gear 51.

The idle gear 53 has a right side to which a second scissors gear 55 is relatively rotatably fitted. The second scissors gear 55 has a diameter approximately the same as the outer diameter of the idle gear 53. The second scissors gear 55 meshes with the transmitted gear 52 and is urged by a spring 55a in a rotation direction of the idle gear 53.

The idle gear 53 of the output shaft 33 constantly meshes with the transmitting gear 51 of the power-transmission outer shaft 31b of the odd-numbered stage shaft 31 and also constantly meshes with the transmitted gear 52 of the even-numbered stage shaft 32. When the second clutch 47B is connected, a rotational driving force of the crankshaft 23 is transmitted to the even-numbered stage shaft 32, via the second clutch 47B, the transmitting gear 51 of the power-transmission outer shaft 31b, the idle gear 53, and the transmitted gear 52. At this time, the first scissors gear 54, which is provided at the left side of the idle gear 53, prevents backlash between the transmitting gear 51 and the idle gear 53, whereas the second scissors gear 55, which is provided at the right side of the idle gear 53, prevents backlash between the idle gear 53 and the transmitted gear 52. This structure reduces rattle noise that is generated between gears at the time of shifting to the even-numbered stage.

The gear group G that is provided to the transmission T has the following structure.

The four driving gears of the odd-numbered stages: the driving gear m1 with a gear ratio for a first speed, the driving gear m3 with a gear ratio for a third speed, the driving gear m7 with a gear ratio for a seventh speed, and the driving gear m5 with a gear ratio for a fifth speed, in this order from the left side, are respectively relatively rotatably supported by the odd-numbered stage main shaft 31a of the odd-numbered stage shaft 31 via the respective needle bearings 56.

The four driving gears of the even-numbered stages: the driving gear m2 with a gear ratio for a second speed, the driving gear m4 with a gear ratio for a fourth speed, the driving gear m8 with a gear ratio for an eighth speed, and the driving gear m6 with a gear ratio for a sixth speed, in this order from the left side, are respectively relatively rotatably supported by the even-numbered stage shaft 32 via respective needle bearings 57.

The four driven gears: the driven gears c1, c2, c3, and c4, are provided to the output shaft 33, in this order from the left side. These driven gears c1 to c4 are respectively spline-fitted to the output shaft 33 and are respectively integrally rotates with the output shaft 33.

The driving gear m1 of the odd-numbered stage shaft 31 and the driving gear m2 of the even-numbered stage shaft 32 are paired and, both constantly mesh with the driven gear c1 of the output shaft 33. Similarly, the driving gears m3, m7, and m5 of the odd-numbered stage shaft 31 are respectively paired with the driving gears m4, m8, and m6 of the even-numbered stage shaft 32, and the paired driving gears respectively constantly mesh with the driven gears c2, c3, and c4.

As shown in FIG. 4, the odd-numbered stage main shaft 31a of the odd-numbered stage shaft 31 is provided with a sleeve 61 that is positioned between the driving gear m1 for the first speed and the driving gear m3 for the third speed and also between the driving gear m7 for the seventh speed and the driving gear m5 for the fifth speed. The sleeve 61 is included in a gear switching mechanism 60. The sleeve 61 is slidable on the odd-numbered stage shaft 31 in the axial direction and is selectively engaged with the adjacent driving gear m1, m3, m5, or m7 via a synchronizer S.

The even-numbered stage shaft 32 is also provided with a sleeve 61 that is positioned between the driving gear m2 for the second speed and the driving gear m4 for the fourth speed and also between the driving gear m8 for the eighth speed and the driving gear m6 for the sixth speed. The sleeve 61 is included in a gear switching mechanism 60. The sleeve 61 is slidable on the even-numbered stage shaft 32 in the axial direction and is selectively engaged with the adjacent driving gear m2, m4, m6, or m8 via a synchronizer S.

Figure 7:
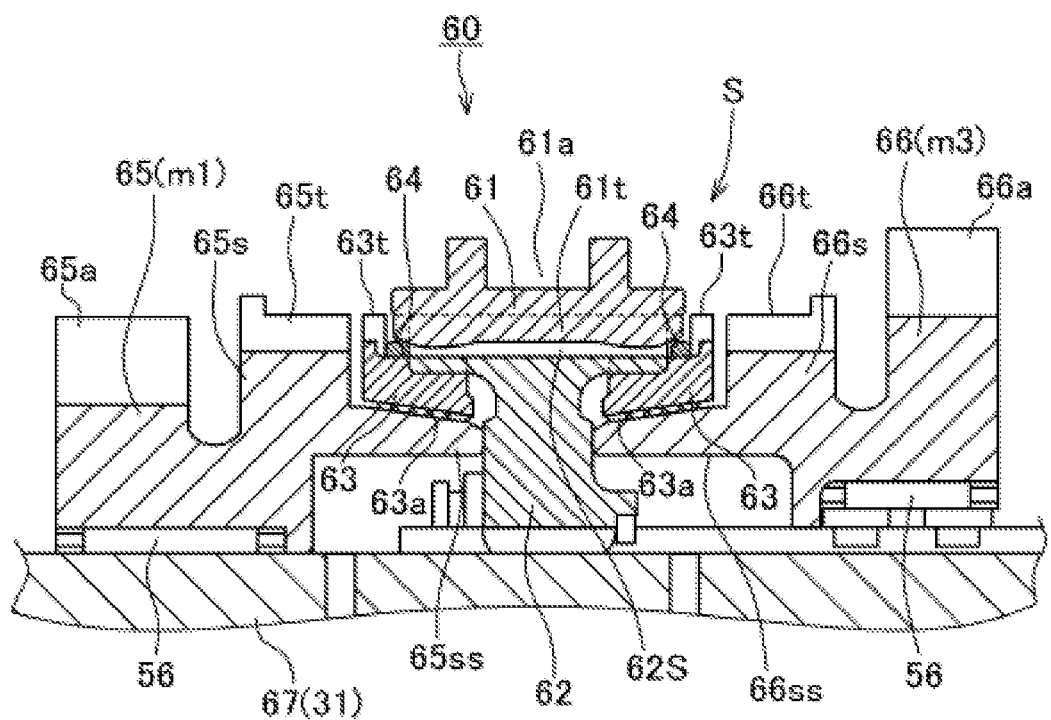
FIG. 7 is a sectional view of the periphery of a gear switching mechanism
Figure 8:
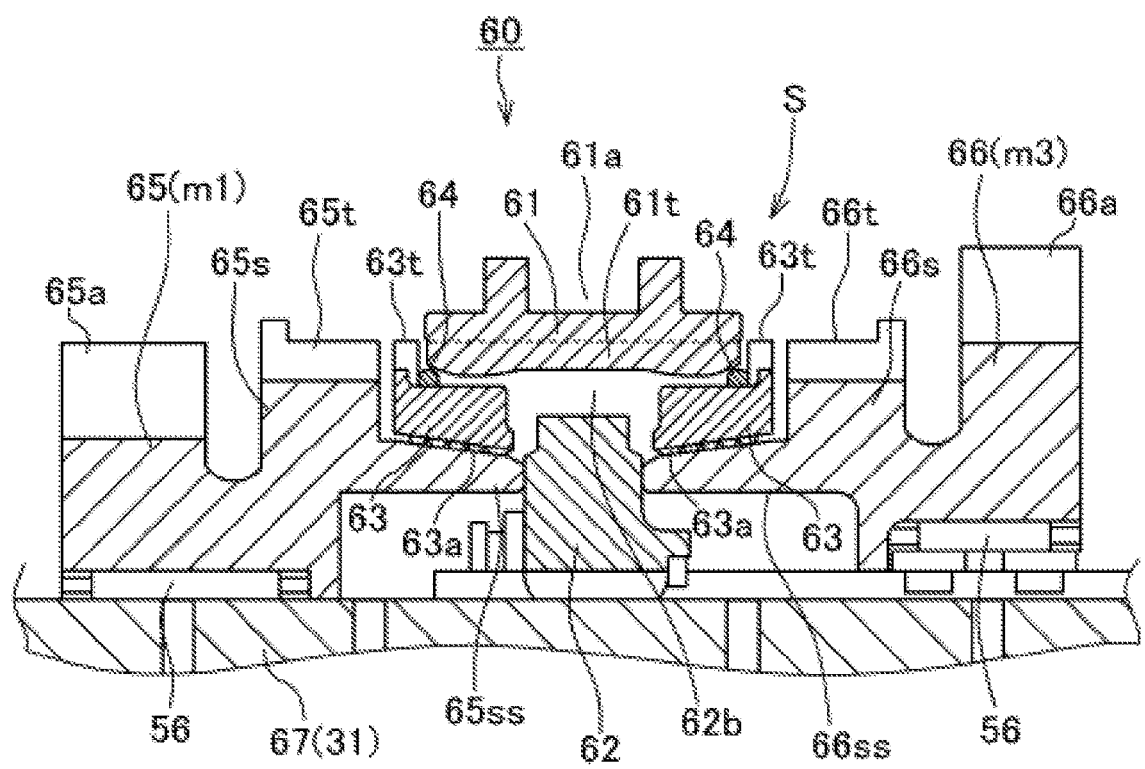
FIG. 8 is a sectional view of the periphery of the gear switching mechanism.

As shown in FIGS. 7 and 8, each of the sleeves 61 is provided with a fork engaging groove 61a and is made movable in the axial direction by a shift fork 91 that engages with the fork engaging groove 61a.

The gear switching mechanism 60 includes the synchronizer S. The synchronizer S is provided between each of the sleeves 61 and the driving gear that is to be engaged with the corresponding sleeve 61. Each of the synchronizers S establishes the corresponding speed stage while synchronizing the sleeve 61 with the driving gear.

The gear switching mechanism 60 and the synchronizer S, which are provided between the driving gear m1 for establishing the first speed stage and the driving gear m3 for establishing the third speed stage, among the driving gears for establishing the speed stages, will be described with reference to FIGS. 7 and 8.

The structures of these gear switching mechanism 60 and synchronizer S also apply to the other gear switching mechanisms 60 and synchronizers S, respectively.

As shown in FIGS. 7 and 8, a shift gear 65 that is represented by the driving gear m1 for the first speed and a shift gear 66 that is represented by the driving gear m3 for the third speed are rotatably supported by a rotation shaft 67 via the needle bearings 56. The rotation shaft 67 corresponds to the odd-numbered stage shaft 31 in this embodiment.

The shift gear 65 has shift gear teeth 65a on an outer circumference as driving gear teeth for the first speed. The shift gear 65 also has gear dog teeth 65t formed on an outer circumference of a cylindrical part 65s that protrudes toward the shift gear 66, which represents the driving gear m3 for the third speed. The cylindrical part 65s, which has the gear dog teeth 65t on the outer circumference, also has a protruding cylindrical part 65ss that is formed by protruding an inner peripheral part.

The shift gear 66 has shift gear teeth 66a on an outer circumference as driving gear teeth for the third speed. The shift gear 66 also has gear dog teeth 66t formed on an outer circumference of a cylindrical part 66s that protrudes toward the shift gear 65, which represents the driving gear m1 for the first speed. The cylindrical part 66s, which has the gear dog teeth 66t on the outer circumference, also has a protruding cylindrical part 66ss that is formed by protruding an inner peripheral part.

The sleeve 61 is spline-fitted to an outer circumferential surface of a hub 62 in a slidable manner in the axial direction. The hub 62 is spline-fitted to the odd-numbered stage main shaft 31a while movement in the axial direction is inhibited. The hub 62 includes spline teeth 62s that are formed on an outer circumferential surface. The spline teeth 62s engage with sleeve teeth 61t that are formed on an inner circumferential surface of the sleeve 61.

Among the multiple spline teeth 62s that are formed on the outer circumferential surface of the hub 62, the spline teeth 62s at an interval of 120 degrees in the circumferential direction are cut off to form three cut-off grooves 62b.

The sleeve teeth 61t are circularly arrayed on the inner circumferential surface of the sleeve 61 and are respectively tapered at each end.

The fork engaging groove 61a that engages with the shift fork 91 is formed on the outer circumference of the sleeve 61.

The protruding cylindrical part 65ss of the shift gear 65 and the sleeve 61 have a blocking ring 63 and a synchronizing spring 64 that are disposed therebetween. Similarly, the protruding cylindrical part 66ss of the shift gear 66 and the sleeve 61 have a blocking ring 63 and a synchronizing spring 64 that are disposed therebetween. The blocking ring 63 is formed with ring teeth 63t that have a diameter approximately the same as the diameter of the gear dog teeth 65t of the shift gear 65 and the diameter of the gear dog teeth 66t of the shift gear 66.

In establishing the speed stage, the sleeve 61 that engages with the shift fork 91 is slid to the shift gear 66 by the gear shift operation mechanism 70, from a neutral state as shown in FIG. 7. Thus, the sleeve 61 comes into contact with a left surface of the synchronizing spring 64, and the blocking ring 63 comes into contact with a right surface of the synchronizing spring 64, to start synchronizing of the sleeve 61.

This synchronizing operation of the synchronizer S will be described with reference to FIGS. 9A to 9G.

Figure 9:
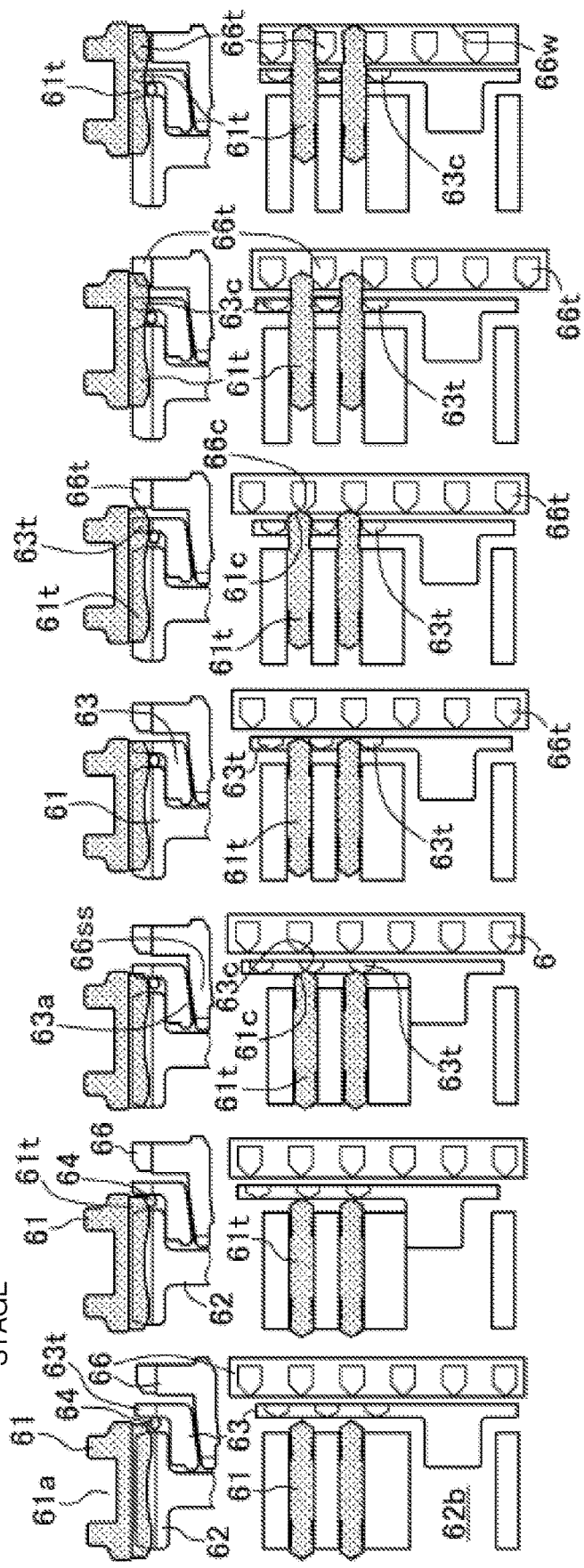
FIGS. 9A to 9G are schematic drawings showing a synchronizing operation of a synchronizer in time sequence.

FIG. 9A shows a neutral state before shifting of the gears is started. In the neutral state, the sleeve 61 is at a neutral position, and the sleeve teeth 61t are not in contact with the synchronizing springs 64 in the left-right direction and thereby do not start the synchronizing operation.

After the shifting of the gears is started, the sleeve 61 moves in the right direction. As shown in FIG. 9B, the sleeve teeth 61t of the sleeve 61 come into contact with the synchronizing spring 64 and is able to press the blocking ring 63 toward the shift gear 66 via the synchronizing spring 64. This movement is in a synchronizing spring contacting stage.

When the sleeve 61 further moves in the right direction, as shown in FIG. 9C, the blocking ring 63 is pressed toward the shift gear 66, and a frictional force is generated between an inner circumferential surface 63a of the blocking ring 63 and the protruding cylindrical part 66ss of the shift gear 66. Meanwhile, tips of the sleeve teeth 61t come into contact with tips of the ring teeth 63t, and then, chamfered surfaces 61c of the sleeve teeth 61t come into contact with chamfered surfaces 63c of the ring teeth 63t, whereby synchronization is started. This movement is in a balking stage.

Then, when the sleeve 61 further moves in the right direction, as shown in FIG. 9D, the sleeve teeth 61t mesh with the ring teeth 63*t* by pushing the ring teeth 63*t* aside, which results in integral rotation of the sleeve 61 and the blocking ring 63. This movement is in a blocking ring pushing-aside stage.

When the sleeve 61 further moves in the right direction, as shown in FIG. 9E, the tips of the sleeve teeth 61*t* come into contact with tips of the gear dog teeth 66*t* of the shift gear 66, and then, the chamfered surfaces 61*c* of the sleeve teeth 61*t* come into contact with chamfered surfaces 66*c* of the gear dog teeth 66*t*. This movement is in a gear dog teeth contacting stage.

When the sleeve 61 further moves in the right direction, as shown in FIG. 9F, the sleeve teeth 61*t* mesh with the gear dog teeth 66*t* by pushing the gear dog teeth 66*t* aside, resulting in completion of the synchronization. This movement is in a gear dog teeth pushing-aside stage.

When the sleeve 61 further moves in the right direction, as shown in FIG. 9G, the sleeve teeth 61*t* completely mesh with the gear dog teeth 66*t*, whereby the sleeve 61, including the odd-numbered stage shaft 31, and the shift gear 66, integrally rotate. This movement is in an in-gear stage.

The synchronizer S operates as described above, thereby engaging the sleeve 61 with the shift gear 66 while synchronizing them with each other.

Next, the gear shift operation mechanism 70 for moving the sleeve 61 of the gear switching mechanism 60 will be described with reference to FIGS. 5 and 6.

The gear shift operation mechanism 70 includes a shift motor 72, a reduction gear mechanism 73, a shift spindle 74, a master arm 75, an intermittently sending mechanism 76, the shift drum 80, a shift fork shaft 90, and the shift fork 91. FIG. 6 shows a structure for changing the speed stage of the transmission mechanism 30. The shift motor 72 provides a rotational driving force, which is reduced by the reduction gear mechanism 73. The reduced rotational driving force rotates the shift spindle 74 and causes the master arm 75 to rotate integrally with the shift spindle 74, thereby making the intermittently sending mechanism 76 intermittently rotate the shift drum 80 to move the shift fork 91. As a result, a target sleeve 61 of the gear switching mechanism 60 is moved in the axial direction to change the speed stage of the transmission mechanism 30.

The shift motor 72 is fixed to the left unit-case cover 28L on the left side of the lower transmission-case half part 22D. The reduction gear mechanism 73 is provided between the lower transmission-case half part 22D and the left unit-case cover 28L. The reduction gear mechanism 73 includes a driving gear 73*a*, first and second gears 73*b* and 73*c*, and a driven gear 73*d*. The driving gear 73*a* is integrally formed to a motor shaft 72*a* of the shift motor 72. The first and second gears 73*b* and 73*c* are a large gear and a small gear. The driven gear 73*d* is fitted to the shift spindle 74.

The shift spindle 74 is rotatably supported by the lower transmission-case half part 22D via bearings, at a part in the vicinity of a left end and at a part in the vicinity of a right end. The master arm 75 is welded to a part in the vicinity of the right end of the shift spindle 74 to make the shift spindle 74 and the master arm 75 integrally rotate.

The shift drum 80 is formed into a hollow cylindrical shape. The shift drum 80 has a right end part and a left end part that are rotatably supported by the lower transmission-case half part 22D respectively via a ball bearing 88 and a needle bearing 89, so as to be parallel to the rotation axis of the crankshaft 23, under the odd-numbered stage shaft 31.

The right end part of the shift drum 80 is provided with the intermittently sending mechanism 76 that intermittently rotates the shift drum 80. The intermittently sending mechanism 76 is connected to the master arm 75 via a pin 76*a*. The shift drum 80 includes four leading grooves 80*a* that are provided on a radial outer circumferential surface.

As shown in FIGS. 3 and 5, the shift fork shafts 90 are disposed upward and rearward of the shift drum 80 and are supported by the lower transmission-case half part 22D in parallel to the shift drum 80, while both ends of the shift fork shafts 90 are fitted to the lower transmission-case half part 22D. The shift fork shafts 90 support four shift forks 91 in an individually movable manner in the axial direction.

As shown in FIG. 5, the shift fork 91 includes a base 91*a*, a fork part 91*c*, and a pin part 91*d*. The base 91*a* is formed with a shaft insertion hole 91*b* to which the shift fork shaft 90 is inserted. The fork part 91*c* extends branchingly from the base 91*a* in a direction perpendicular to the shift fork shaft 90. The pin part 91*d* is provided at a side opposite to the fork part 91*c* across the base 91*a*.

The fork part 91*c* engages with the fork engaging groove 61*a*, which is formed in the sleeve 61. The pin part 91*d* engages with a corresponding leading groove 80*a*, which is formed on the outer circumferential surface of the shift drum 80.

When the shift drum 80 is driven by the shift motor 72 of the gear shift operation mechanism 70 and is thereby rotated, the shift fork 91 is guided by the corresponding leading groove 80*a*, which is formed on the outer circumferential surface of the shift drum 80, and moves in the axial direction. Thus, the corresponding sleeve 61 is moved in the axial direction, and the speed stage is changed.

Although the sleeve 61 with no shift gear is used in the gear switching mechanism 60 in this embodiment, a shifter gear with a shift gear that is integrally formed to a sleeve may also be used.

As shown in FIG. 3, the transmission T is configured so that a diameter d3 of the idle gear 53 will be greater than a diameter d1 of the transmitting gear 51 and a diameter d2 of the transmitted gear 52. That is, the diameters of the transmitting gear 51 and the transmitted gear 52 are made small, and only the idle gear 53 is a large diameter gear. This structure enables reducing the dimension of the power unit P as viewed from a side, compared with a structure in which the idle gear has a small diameter, and the transmitting gear and the transmitted gear have large diameters.

On the other hand, the transmitting gear 51 and the transmitted gear 52, which respectively have the diameter d1 and the diameter d2 that are smaller than the diameter d3 of the idle gear 53, both have small numbers of teeth. It is difficult to finely adjust the ratio between the transmitting gear 51 and the transmitted gear 52 with such small numbers of teeth.

Figure 10:
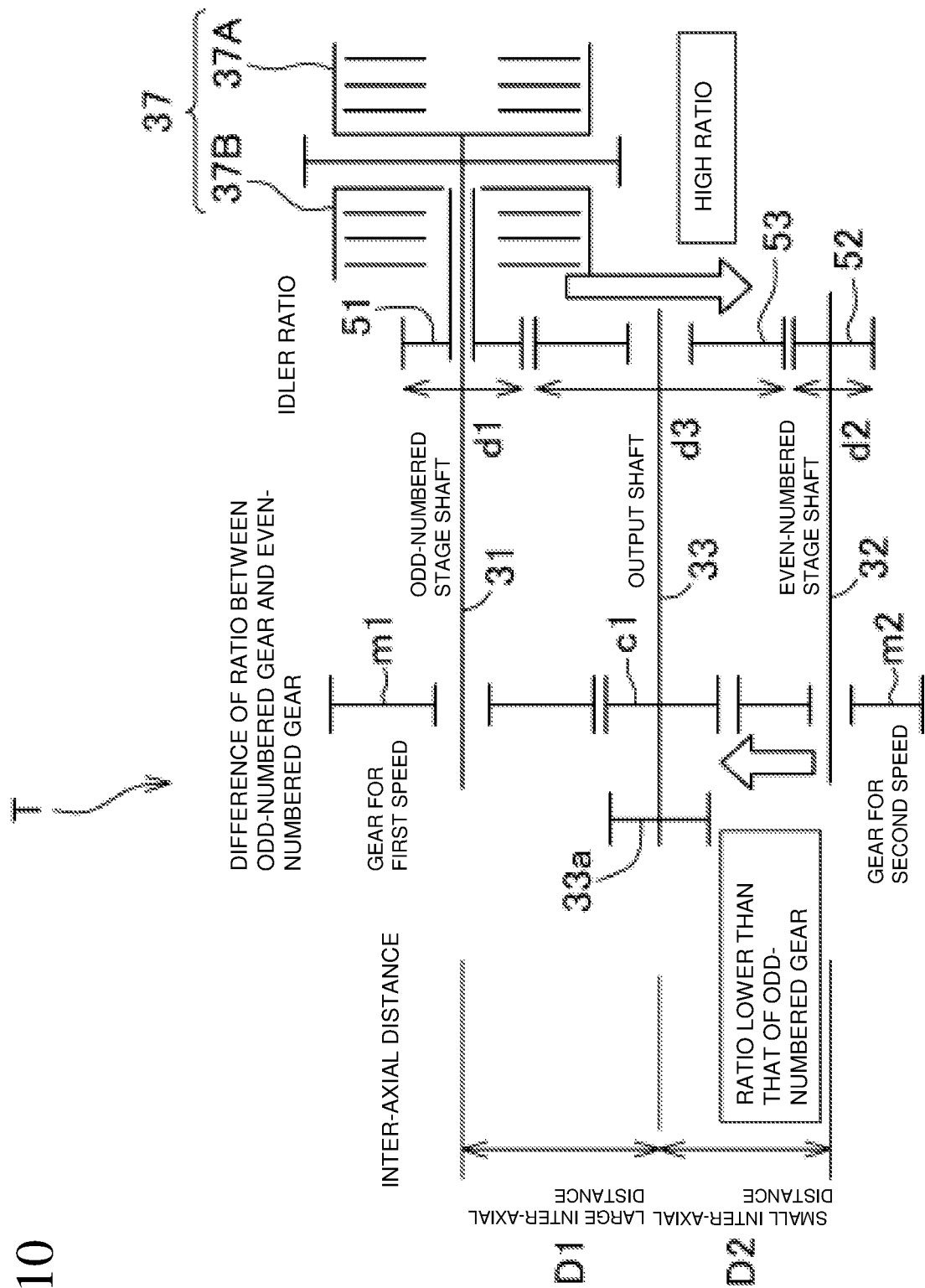
FIG. 10 is a schematic drawing of the transmission.
Figure 11:
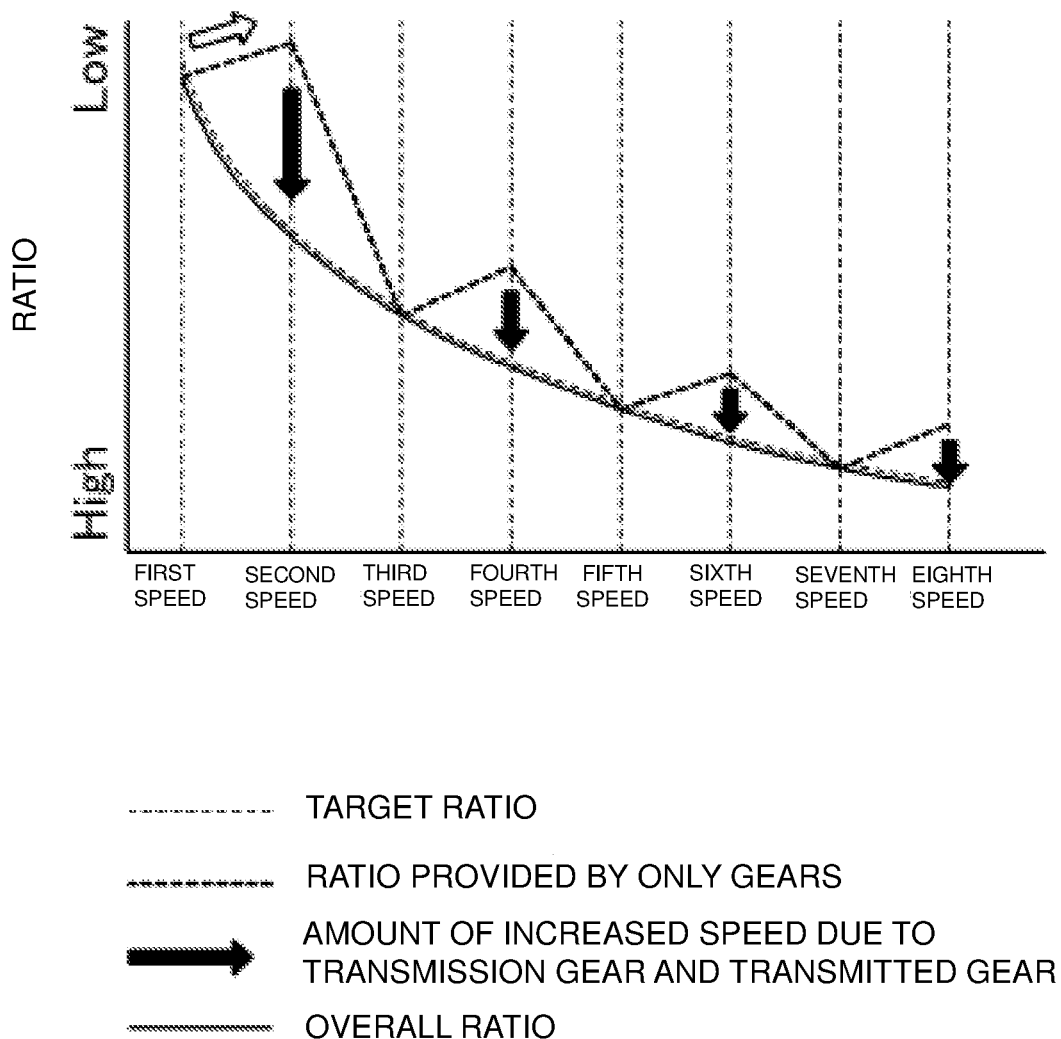
FIG. 11 shows a relationship between a change of speed stage and a ratio of the transmission.

FIG. 10 is a schematic drawing of the transmission T and shows the driving gear m1 for the first speed and the driving gear m2 for the second speed as examples among the driving gears. FIG. 11 shows a ratio for each speed stage. The dashed thin line shows a target ratio. The dashed thick line shows a ratio due to changing of speed only by each of the gears m1 to m8 and c1 to c4. The black arrow shows an amount of increased speed due to the transmitting gear 51 and the transmitted gear 52. The solid line shows an overall ratio obtained by adding the amount of increased speed due to the transmitting gear 51 and the transmitted gear 52 to the ratio of each of the gears m1 to m8 and c1 to c4.

As shown in FIGS. 3 and 10, the odd-numbered stage shaft 31, the even-numbered stage shaft 32, and the output shaft 33 are arranged so that the center distance D1 between the odd-numbered stage shaft 31 and the output shaft 33 will be longer than the center distance D2 between the even-numbered stage shaft 32 and the output shaft 33. That is, the diameter d1 of the transmitting gear 51 is made greater than the diameter d2 of the transmitted gear 52, and thus, the ratio is greatly increased by the transmission from the transmitting gear 51 to the transmitted gear 52. Adjustment of the ratios of the gears m1 to m8 and c1 to c4 are easier than that of the transmitting gear 51 and the transmitted gear 52 because the gears m1 to m8 and c1 to c4 have diameters greater than those of the transmitting gear 51 and the transmitted gear 52. Thus, the ratio of the even-numbered speed stage is finely adjusted to be lower than the ratio of the odd-numbered speed stage to cause a decrease in speed, whereby the target ratio is achieved.

The power unit P for a saddled vehicle of this embodiment is thus structured. The power unit P includes the internal-combustion engine E, the odd-numbered stage shaft 31 and the even-numbered stage shaft 32 that receive power from the crankshaft 23, and the twin clutch unit 47 contained in the unit case 20. The clutch unit 47 includes the first clutch 47A and the second clutch 47B to transmit the power in accordance with selective connection of the first clutch 47A and the second clutch 47B. The first clutch 47A transmits and shuts off the power between the crankshaft 23 and the odd-numbered stage shaft 31. The second clutch 47B transmits and shuts off the power between the crankshaft 23 and the even-numbered stage shaft 32. The power unit P also includes the output shaft 33 that receives the power from selected one of the odd-numbered stage shaft 31 and the even-numbered stage shaft 32, the multiple odd-numbered stage driving gears m1, m3, m5, and m7 provided to the odd-numbered stage shaft 31, the multiple even-numbered stage driving gears m2, m4, m6, and m8 provided to the even-numbered stage shaft 32, and the multiple driven gears c1 to c4 provided to the output shaft 32. The driven gears c1, c2, c3, and c4 respectively mesh with the odd-numbered stage driving gears m1, m3, m7, and m5 and also respectively mesh with the even-numbered stage driving gears m2, m4, m8, and m6. The power unit P also includes the sleeves 61, the shift forks 91 that move the sleeves 61 in the axial direction, and the shift drum 80 that drives the shift forks 91. One of the sleeves 61 is provided to the odd-numbered stage shaft 31 and functions as the gear switching mechanism 60 that moves in the axial direction to transmit and shut off the driving force from the odd-numbered stage shaft 31 to and from the odd-numbered stage driving gear m1, m3, m5, or m7. The other sleeve 61 is provided to the even-numbered stage shaft 32 and functions as the gear switching mechanism 60 that moves in the axial direction to transmit and shut off the driving force from the even-numbered stage shaft 32 to and from the even-numbered stage driving gear m2, m4, m6, or m8. The odd-numbered stage shaft 31, the even-numbered stage shaft 32, the output shaft 33, and the shift drum 80 are arranged in parallel so as to have the following configuration as viewed from the side of the motorcycle 1, as shown in FIG. 3. That is, the output shaft 33 is disposed rearward of the crankshaft 23, and the odd-numbered stage shaft 31 and the even-numbered stage shaft 32 are disposed rearward of the crankshaft 23. The odd-numbered stage shaft 31 is provided on the side opposite to the even-numbered stage shaft 32 relative to the line L1 connecting the crankshaft 23 and the output shaft 33. The shift drum 80 is disposed on the side opposite to the output shaft 33 relative to the line L2 connecting the odd-numbered stage shaft 31 and the even-numbered stage shaft 32.

The power unit P thus structured may be employed as a power unit P for a saddled vehicle, which has an internal-combustion engine E and a transmission T that are combined together. In this case, a driving shaft is separated into the odd-numbered stage shaft 31 and the even-numbered stage shaft 32. This enables reducing the dimension in the width direction of the power unit P and arranging the odd-numbered stage shaft 31, the even-numbered stage shaft 32, the output shaft 33, and the shift drum 80 of the transmission T close to each other. Thus, it is possible to reduce the dimension of the power unit P as viewed from the side of the motorcycle 1, thereby reducing the overall dimensions of the power unit P.

At least one of the odd-numbered stage shaft 31 and the even-numbered stage shaft 32 are disposed between the crankshaft 23 and the output shaft 33 in the front-rear direction of the vehicle. In this embodiment, the odd-numbered stage shaft 31 is disposed between the crankshaft 23 and the output shaft 33. This enables disposing the shafts and the shift drum 80 of the transmission T in proximity to a center of the power unit P, thereby facilitating reduction in dimensions of the power unit P.

As shown in FIGS. 3 and 4, each of the driven gears c1, c2, c3, and c4 on the output shaft 33 constantly meshes with either one of the odd-numbered stage driving gears m1, m3, m5, and m7 and also constantly meshes with the even-numbered stage driving gear that is paired with the either one of the odd-numbered stage driving gears, thereby being shared. This structure uses a less number of the driven gears on the output shaft 33 and thereby enables reducing the dimension in the axial direction of the power unit P.

As shown in FIGS. 3 and 4, the first clutch 47A and the second clutch 47B are arranged on the shaft of the odd-numbered stage shaft 31, and the transmitting gear 51 that receives the power from the crankshaft 23 via the second clutch 47B is relatively rotatably supported by the odd-numbered stage shaft 31. Moreover, the idle gear 53 that constantly meshes with the transmitting gear 51 is relatively rotatably supported by the output shaft 33, and the even-numbered stage shaft 32 includes the transmitted gear 52 that constantly meshes with the idle gear 53, in a relatively unrotatable manner. Furthermore, the diameter d3 of the idle gear 53 is made greater than the diameter d1 of the transmitting gear 51 and the diameter d2 of the transmitted gear 52. The idle gear 53 with a large diameter meshes with both of the transmitting gear 51 and the transmitted gear 52, and thus, the transmitting gear 51 and the transmitted gear 52 are reduced in diameter. This enables further reducing the dimension of the power unit P as viewed from the side.

As shown in FIGS. 3 and 10, the center distance D1 between the odd-numbered stage shaft 31 and the output shaft 33 is made longer than the center distance D2 between the even-numbered stage shaft 32 and the output shaft 33. Thus, speed is greatly increased at the transmitted gear 52 of the even-numbered stage shaft 32, from the transmitting gear 51 of the odd-numbered stage shaft 31 via the idle gear 53 of the output shaft 33. In general, a gear with a small diameter has a small number of teeth, and therefore, a ratio is greatly changed by changing the number of teeth only by one and is difficult to adjust. However, a target ratio is easily achieved by the following manner. That is, the speed is greatly increased at the transmitted gear 52 from the transmitting gear 51 via the idle gear 53, and the resultant ratio is finely adjusted so that the speed is decreased by the gear on the transmission shaft, which has a diameter greater than that of each of the transmitting gear 51 and the transmitted gear 52.

As shown in FIG. 4, the idle gear 53 has the first scissors gear 54 at a left surface and the second scissors gear 55 at a right surface. The first scissors gear 54 and the second scissors gear 55 are urged in directions opposite to each other. The first scissors gear 54 meshes with the transmitting gear 51, whereas the second scissors gear 55 meshes with the transmitted gear 52. Thus, the first scissors gear 54 reduces backlash between the idle gear 53 and the transmitting gear 51, whereas the second scissors gear 55 reduces backlash between the idle gear 53 and the transmitted gear 52. This structure reduces rattle noise that is generated between gears at the time of shifting gears.

As shown in FIG. 3, as viewed from the side of the motorcycle 1, the engine hanger 2a that supports the power unit P is disposed under the even-numbered stage shaft 32. Although the two shafts, the odd-numbered stage shaft 31 and the even-numbered stage shaft 32, are used for supporting the driving gears m1 to m8, a body frame for supporting a power unit that has one shaft for supporting driving gears is able to be used without greatly changing the structure. This is because the transmitted gear 52 of the even-numbered stage shaft 32 is made to have a small diameter, and the engine hanger 2a for supporting the power unit P for the saddled vehicle is disposed under the even-numbered stage shaft 32.

All of the odd-numbered stage driving gears m1, m3, m5, and m7 are relatively rotatably supported by the odd-numbered stage shaft 31. The left end of the odd-numbered stage shaft 31 is rotatably supported by the unit case 20 via the bearing 34. The bearing 34 and the odd-numbered stage driving gear m1 have the washer 49 that is provided therebetween. The washer 49 is spline-fitted to the odd-numbered stage shaft 31 to integrally rotate therewith. The washer 49 has the circumferential edge provided with the projecting teeth 49a. Projections and recessions that are formed by the projecting teeth 49a are sensed by the odd-numbered stage shaft rotation sensor 104 to measure the number of rotation of the odd-numbered stage shaft 31. That is, the number of rotation of the odd-numbered stage shaft 31, which rotatably supports all of the odd-numbered stage driving gears m1, m3, m5, and m7, is measured by using the projecting teeth 49a that are provided to the washer 49 used in the structure. This enables measuring the number of rotation of the odd-numbered stage shaft 31 without having to separately provide a dedicated component.

The above describes the embodiment of the present invention. However, the present invention is by no means limited to the embodiment described above and may undergo various design modifications without departing from the gist of the present invention. Of course, the elements such as the saddled vehicle and the power unit can variously be modified within the scope of the gist of the present invention.

For convenience of explanation, only the embodiment having the structural configuration in the left-right direction as shown in the drawings is described. However, any other embodiments that fall in the scope of the gist of the present invention are also included in the present invention, although having a structural configuration in the left-right direction, which is different from the above-described structural configuration.

REFERENCE SIGNS LIST

P . . . power unit
E . . . internal-combustion engine
T . . . transmission
m1 . . . driving gear for first speed
m2 . . . driving gear for second speed
m3 . . . driving gear for third speed
m4 . . . driving gear for fourth speed
m5 . . . driving gear for fifth speed
m6 . . . driving gear for sixth speed
m7 . . . driving gear for seventh speed
m8 . . . driving gear for eighth speed
c1 . . . first driven gear
c2 . . . second driven gear
c3 . . . third driven gear
c4 . . . fourth driven gear
L1 . . . line
L2 . . . line
d1 . . . diameter of transmitting gear
d2 . . . diameter of transmitted gear
d3 . . . diameter of idle gear
D1 . . . center distance between odd-numbered stage shaft and output shaft
D2 . . . center distance between even-numbered stage shaft and output shaft
S . . . synchronizer
1 . . . motorcycle
2 . . . body frame
2a . . . engine hanger
20 . . . unit case
23 . . . crankshaft
31 . . . odd-numbered stage shaft
32 . . . even-numbered stage shaft
33 . . . output shaft
34 . . . bearing
47 . . . clutch unit
47A . . . first clutch
47B . . . second clutch
49 . . . washer
49a . . . projecting teeth
51 . . . transmitting gear
52 . . . transmitted gear
53 . . . idle gear
54 . . . first scissors gear
55 . . . second scissors gear
80 . . . shift drum
91 . . . shift fork
104 . . . odd-numbered stage shaft rotation sensor

What is claimed is:

1. A power unit for a saddled vehicle, comprising:
an internal-combustion engine (E);
an odd-numbered stage shaft (31) that receives power from a crankshaft (23) of the internal-combustion engine (E);
an even-numbered stage shaft (32) that receives the power from the crankshaft (23);
a twin clutch unit (47) contained in a unit case (20) and including a first clutch (47A) and a second clutch (47B) to transmit the power in accordance with selective connection of the first clutch (47A) and the second clutch (47B), the first clutch (47A) configured to transmit and shut off the power between the crankshaft (23) and the odd-numbered stage shaft (31), and the second clutch (47B) configured to transmit and shut off the power between the crankshaft (23) and the even-numbered stage shaft (32);
an output shaft (33) that receives the power from a selected one of the odd-numbered stage shaft (31) and the even-numbered stage shaft (32);
multiple odd-numbered stage driving gears (m1, m3, m5, m7) provided to the odd-numbered stage shaft (31);
multiple even-numbered stage driving gears (m2, m4, m6, m8) provided to the even-numbered stage shaft (32);

multiple driven gears (c1, c2, c3, c4) provided to the output shaft (33) and respectively meshing with the multiple odd-numbered stage driving gears (m1, m3, m5, m7) and with the multiple even-numbered stage driving gears (m2, m4, m6, m8);

a gear switching mechanism (60) provided to the odd-numbered stage shaft (31) and configured to move in an axial direction to transmit and shut off a driving force from the odd-numbered stage shaft (31), to and from the odd-numbered stage driving gear (m1, m3, m5, m7);

a gear switching mechanism (60) provided to the even-numbered stage shaft (32) and configured to move in an axial direction to transmit and shut off a driving force from the even-numbered stage shaft (32), to and from the even-numbered stage driving gear (m2, m4, m6, m8);

a shift fork (91) that moves the gear switching mechanism (60) in the axial direction; and a shift drum (80) that drives the shift fork (91), and the odd-numbered stage shaft (31), the even-numbered stage shaft (32), the output shaft (33), and the shift drum (80) being arranged in parallel, wherein, as viewed from a side of the saddled vehicle, the output shaft (33) is disposed rearward of the crankshaft (23), the odd-numbered stage shaft (31) and the even-numbered stage shaft (32) are disposed rearward of the crankshaft (23), the odd-numbered stage shaft (31) is provided on a side opposite to the even-numbered stage shaft (32) relative to a line (L1) connecting the crankshaft (23) and the output shaft (33), and the shift drum (80) is disposed on a side opposite to the output shaft (33) relative to a line (L2) connecting the odd-numbered stage shaft (31) and the even-numbered stage shaft (32).

2. The power unit for the saddled vehicle according to claim 1, wherein at least one of the odd-numbered stage shaft (31) and the even-numbered stage shaft (32) is disposed between the crankshaft (23) and the output shaft (33) in a front-rear direction of the saddled vehicle.

3. The power unit for the saddled vehicle according to claim 2, wherein each of the driven gears (c1, c2, c3, c4) on the output shaft (33) constantly meshes with either one of the odd-numbered stage driving gears (m1, m3, m5, m7) and also constantly meshes with the even-numbered stage driving gear (m2, m4, m6, m8) that is paired with the either one of the odd-numbered stage driving gears (m1, m3, m5, m7), thereby being shared.

4. The power unit for the saddled vehicle according to claim 3, wherein the first clutch (47A) and the second clutch (47B) are disposed to either one (31, 32) of the odd-numbered stage shaft (31) and the even-numbered stage shaft (32), the one shaft (31, 32) relatively rotatably supports a transmitting gear (51) that receives the power from the crankshaft (32) via the first clutch (47A) or the second clutch (47B), the output shaft (33) relatively rotatably supports an idle gear (53) that constantly meshes with the transmitting gear (51), the other shaft of the odd-numbered stage shaft (31) and the even-numbered stage shaft (32) includes a transmitted gear (52) in a relatively unrotatable manner, the transmitted gear (52) constantly meshes with the idle gear (53), and the idle gear (53) has a diameter (d3) that is greater than a diameter (d1) of the transmitting gear (51) and a diameter (d2) of the transmitted gear (52).

5. The power unit for the saddled vehicle according to claim 4, wherein a center distance (D1) between the odd-numbered stage shaft (31) and the output shaft (33) is longer than a center distance (D2) between the even-numbered stage shaft (32) and the output shaft (33).

6. The power unit for the saddled vehicle according to claim 4, wherein the idle gear (53) includes a scissors gear (54, 55) at each surface, the scissors gears (54, 55) are urged in directions opposite to each other, and one of the scissors gears (54, 55) meshes with the transmitting gear (51), whereas the other meshes with the transmitted gear (52).

7. The power unit for the saddled vehicle according to claim 4, wherein, as viewed from the side of the vehicle, an engine hanger (2a) for supporting the power unit (P) for the saddled vehicle is disposed under the even-numbered stage shaft (32).

8. The power unit for the saddled vehicle according to claim 1, wherein all of the odd-numbered stage driving gears (m1, m3, m5, m7) are relatively rotatably supported by the odd-numbered stage shaft (31), the odd-numbered stage shaft (31) has an end that is rotatably supported by the unit case (20) via a bearing (34), the bearing (34) and the odd-numbered stage driving gear (m1) have a washer (49) that is provided therebetween and that rotates integrally with the odd-numbered stage shaft (31), the washer (49) has a circumferential edge that is formed with projecting teeth (49a), and projections and recessions that are formed by the projecting teeth (49a) are sensed by a rotation sensor (104) to measure a number of rotation of the odd-numbered stage shaft (31).

9. The power unit for the saddled vehicle according to claim 5, wherein, as viewed from the side of the vehicle, an engine hanger (2a) for supporting the power unit (P) for the saddled vehicle is disposed under the even-numbered stage shaft (32).

10. The power unit for the saddled vehicle according to claim 6, wherein, as viewed from the side of the vehicle, an engine hanger (2a) for supporting the power unit (P) for the saddled vehicle is disposed under the even-numbered stage shaft (32).

11. The power unit for the saddled vehicle according to claim 2, wherein all of the odd-numbered stage driving gears (m1, m3, m5, m7) are relatively rotatably supported by the odd-numbered stage shaft (31), the odd-numbered stage shaft (31) has an end that is rotatably supported by the unit case (20) via a bearing (34), the bearing (34) and the odd-numbered stage driving gear (m1) have a washer (49) that is provided therebetween and that rotates integrally with the odd-numbered stage shaft (31), the washer (49) has a circumferential edge that is formed with projecting teeth (49a), and projections and recessions that are formed by the projecting teeth (49a) are sensed by a rotation sensor (104) to measure a number of rotation of the odd-numbered stage shaft (31).

12. The power unit for the saddled vehicle according to claim 3, wherein all of the odd-numbered stage driving gears (m1, m3, m5, m7) are relatively rotatably supported by the odd-numbered stage shaft (31), the odd-numbered stage shaft (31) has an end that is rotatably supported by the unit case (20) via a bearing (34), the bearing (34) and the odd-numbered stage driving gear (m1) have a washer (49) that is provided therebetween and that rotates integrally with the odd-numbered stage shaft (31), the washer (49) has a circumferential edge that is formed with projecting teeth (49a), and projections and recessions that are formed by the projecting teeth (49a) are sensed by a rotation sensor (104) to measure a number of rotation of the odd-numbered stage shaft (31).

13. The power unit for the saddled vehicle according to claim 4, wherein all of the odd-numbered stage driving gears (m1, m3, m5, m7) are relatively rotatably supported by the odd-numbered stage shaft (31), the odd-numbered stage shaft (31) has an end that is rotatably supported by the unit case (20) via a bearing (34), the bearing (34) and the odd-numbered stage driving gear (m1) have a washer (49) that is provided therebetween and that rotates integrally with the odd-numbered stage shaft (31), the washer (49) has a circumferential edge that is formed with projecting teeth (49a), and projections and recessions that are formed by the projecting teeth (49a) are sensed by a rotation sensor (104) to measure a number of rotation of the odd-numbered stage shaft (31).

14. The power unit for the saddled vehicle according to claim 5, wherein all of the odd-numbered stage driving gears (m1, m3, m5, m7) are relatively rotatably supported by the odd-numbered stage shaft (31), the odd-numbered stage shaft (31) has an end that is rotatably supported by the unit case (20) via a bearing (34), the bearing (34) and the odd-numbered stage driving gear (m1) have a washer (49) that is provided therebetween and that rotates integrally with the odd-numbered stage shaft (31), the washer (49) has a circumferential edge that is formed with projecting teeth (49a), and projections and recessions that are formed by the projecting teeth (49a) are sensed by a rotation sensor (104) to measure a number of rotation of the odd-numbered stage shaft (31).

15. The power unit for the saddled vehicle according to claim 6, wherein all of the odd-numbered stage driving gears (m1, m3, m5, m7) are relatively rotatably supported by the odd-numbered stage shaft (31), the odd-numbered stage shaft (31) has an end that is rotatably supported by the unit case (20) via a bearing (34), the bearing (34) and the odd-numbered stage driving gear (m1) have a washer (49) that is provided therebetween and that rotates integrally with the odd-numbered stage shaft (31), the washer (49) has a circumferential edge that is formed with projecting teeth (49a), and projections and recessions that are formed by the projecting teeth (49a) are sensed by a rotation sensor (104) to measure a number of rotation of the odd-numbered stage shaft (31).

16. The power unit for the saddled vehicle according to claim 7, wherein all of the odd-numbered stage driving gears (m1, m3, m5, m7) are relatively rotatably supported by the odd-numbered stage shaft (31), the odd-numbered stage shaft (31) has an end that is rotatably supported by the unit case (20) via a bearing (34), the bearing (34) and the odd-numbered stage driving gear (m1) have a washer (49) that is provided therebetween and that rotates integrally with the odd-numbered stage shaft (31), the washer (49) has a circumferential edge that is formed with projecting teeth (49a), and projections and recessions that are formed by the projecting teeth (49a) are sensed by a rotation sensor (104) to measure a number of rotation of the odd-numbered stage shaft (31).

\* \* \* \* \*